United States Patent [19]

Yaguchi et al.

[11] Patent Number: 4,874,077

[45] Date of Patent: Oct. 17, 1989

[54] DEVICE FOR TRANSFERRING A LITHOGRAPHIC PLATE

[75] Inventors: Akio Yaguchi, Hidaka; Takatsugu Kyoo, Iruama, both of Japan

[73] Assignee: Tsubakimoto Chain Co., Japan

[21] Appl. No.: 180,443

[22] Filed: Apr. 8, 1988

[51] Int. Cl.[4] .............................................. B65G 15/00

[52] U.S. Cl. .................................... 198/408; 198/410; 198/399; 198/486.1; 101/477; 271/225; 271/185

[58] Field of Search ............ 198/408, 414, 409, 485.1, 198/486.1, 468.8, 410, 399; 101/477; 271/225, 184, 185, 69

[56] References Cited

U.S. PATENT DOCUMENTS

| | | | |
|---|---|---|---|
| 2,682,946 | 7/1954 | King | 198/486.1 X |
| 4,223,779 | 9/1980 | Hopkins | 198/408 X |
| 4,602,774 | 7/1986 | Kobler | 198/486.1 X |
| 4,605,212 | 8/1986 | Kobler | 198/485.1 X |

FOREIGN PATENT DOCUMENTS

| | | | |
|---|---|---|---|
| 243996 | 2/1912 | Fed. Rep. of Germany | 198/486.1 |
| 62-73946 | 4/1987 | Japan | 101/477 |
| 598816 | 3/1978 | U.S.S.R. | 198/486.1 |
| 711217 | 6/1954 | United Kingdom | 198/486.1 |

*Primary Examiner*—Robert J. Spar
*Assistant Examiner*—Cheryl L. Gastineau
*Attorney, Agent, or Firm*—Steele, Gould & Fried

[57] ABSTRACT

A device is provided for transferring a lithographic plate (S) from a horizontal conveyor (1) to an overhead conveyor (25). The transfer device has orienting means (2) for receiving a transversely extending lithographic plate from the horizontal conveyor (1) and positioning a folded over end portion (12) of the lithographic plate in the path of a hook member (13) carried by an endless chain (30) of an elevator (3), so that the plate (S) is lifted into a vertical position and then deposited on a positioning bed (4). An upper part (23) of the bed (4) is pivotable by a pneumatic or hydraulic cylinder (22) to position the end portion (12) of the plate (S) inwardly of the locus of the hook member (13) as the hook member passes around a lower sprocket wheel (15) of the elevator, so that the hook member passes by without again picking up the lithographic plate. Thereafter, the pivotable portion (23) is pivoted back into alignment with the rest of the positioning bed to present the lithographic plate for collection by the overhead conveyor (25).

5 Claims, 5 Drawing Sheets

DEVICE FOR TRANSFERRING A LITHOGRAPHIC PLATE

BACKGROUND OF THE INVENTION

1. Field of the Invention

This invention relates to a device for transferring a lithographic plate from a horizontal conveyor to an overhead conveyor in the course of conveying the lithographic plate to a point of use. 2. Prior Art In a known printing process for printing newspapers and the like, a lithographic plate having a folded over end portion is delivered from a processing machine on a horizontal conveyor and then needs to be transferred to an overhead conveyor which holds the lithographic plate by the folded over end thereof. This transfer operation has not hitherto been carried out in a mechanised manner.

SUMMARY OF THE INVENTION

It is an object of the present invention to provide a simple and reliable device for transferring such a lithographic plate from the horizontal conveyor to the overhead conveyor in such a process.

Accordingly, the present invention provides a device for transferring a lithographic plate from a horizontal conveyor to an overhead conveyor, which device comprises elevating means having a hook for engaging a folded over end portion of a horizontally disposed lithographic plate to raise the lithographic plate into a vertical position and then to lower the vertically oriented lithographic plate onto a positioning bed provided in the vicinity of a lower end of the elevating means and serving to position the folded over end of the lithographic plate for capture by an overhead conveyor, in which device the positioning bed has a pivotable portion and means are provided to pivot said pivotable portion of the positioning plate when the lithographic plate is deposited on the positioning bed, so that the folded end portion of the lithographic plate is disposed internally of the locus of the hook of the elevating means.

DESCRIPTION OF THE DRAWINGS

In order that the invention may be readily understood, an embodiment thereof will now be described, by way of example, with reference to the accompanying drawings, in which.

DETAILED DESCRIPTION OF THE PREFERRED EMBODIMENTS

Figure 1:
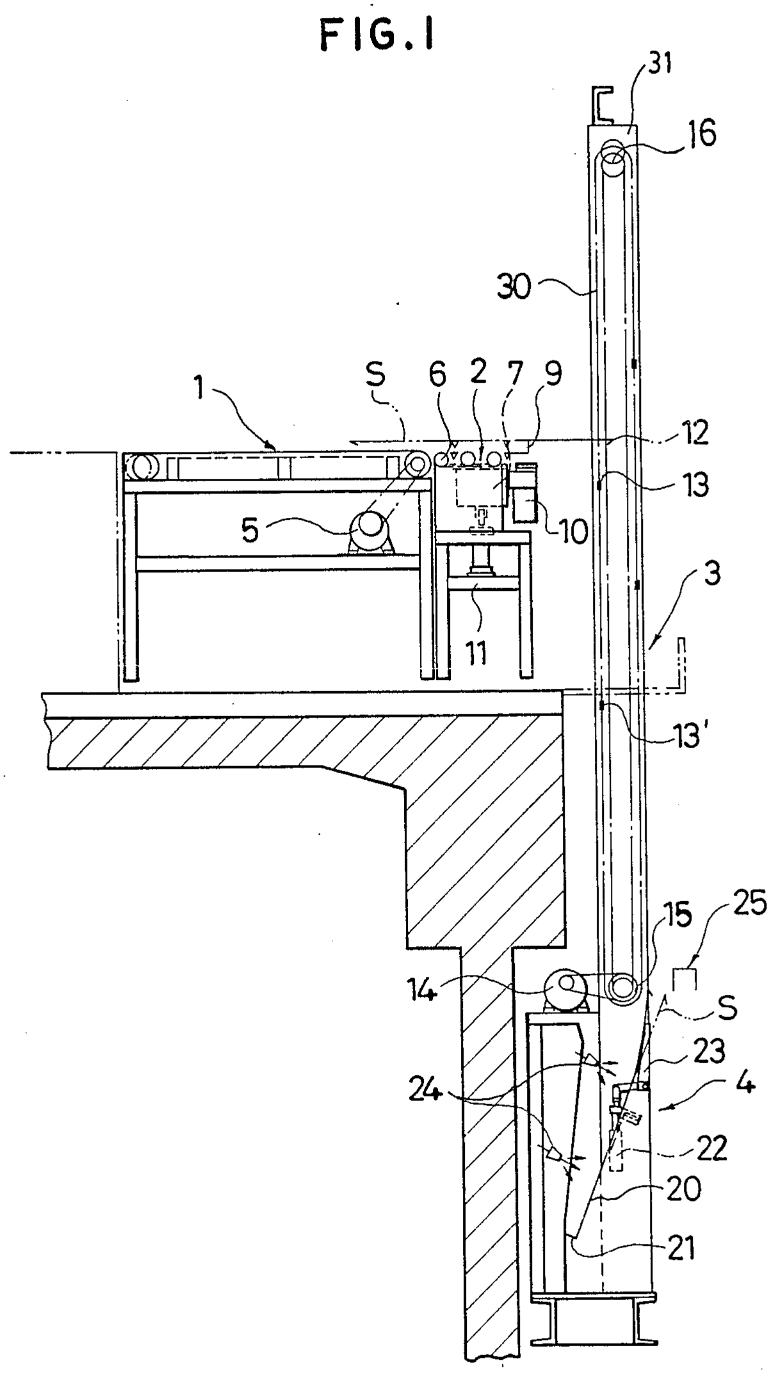
FIG. 1 is a front view, partly in section, of a transfer device embodying the present invention.
Figure 2:
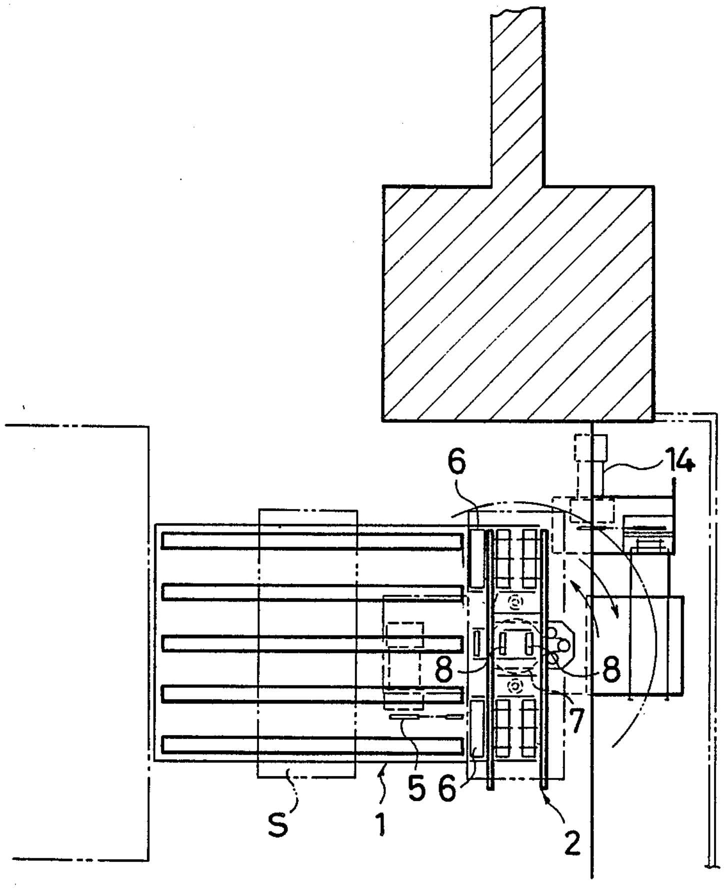
FIG. 2 is a plan view of the device of FIG. 1.
Figure 3:
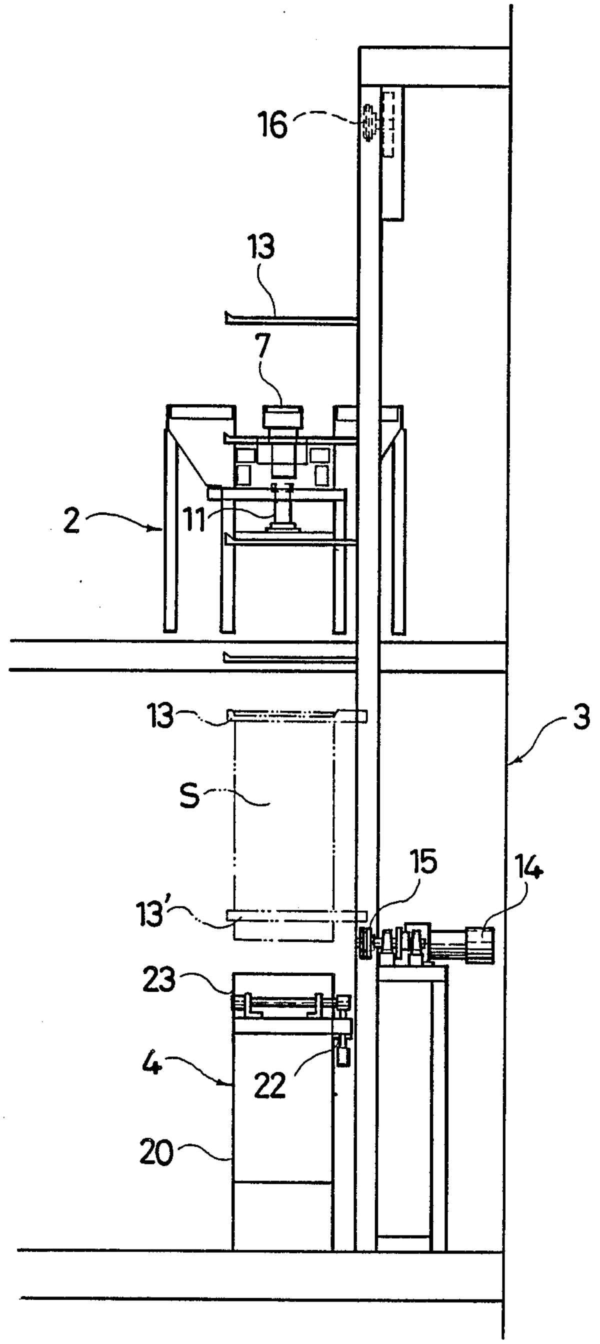
FIG. 3 is a side view of the device shown in FIG. 1.
Figure 4:
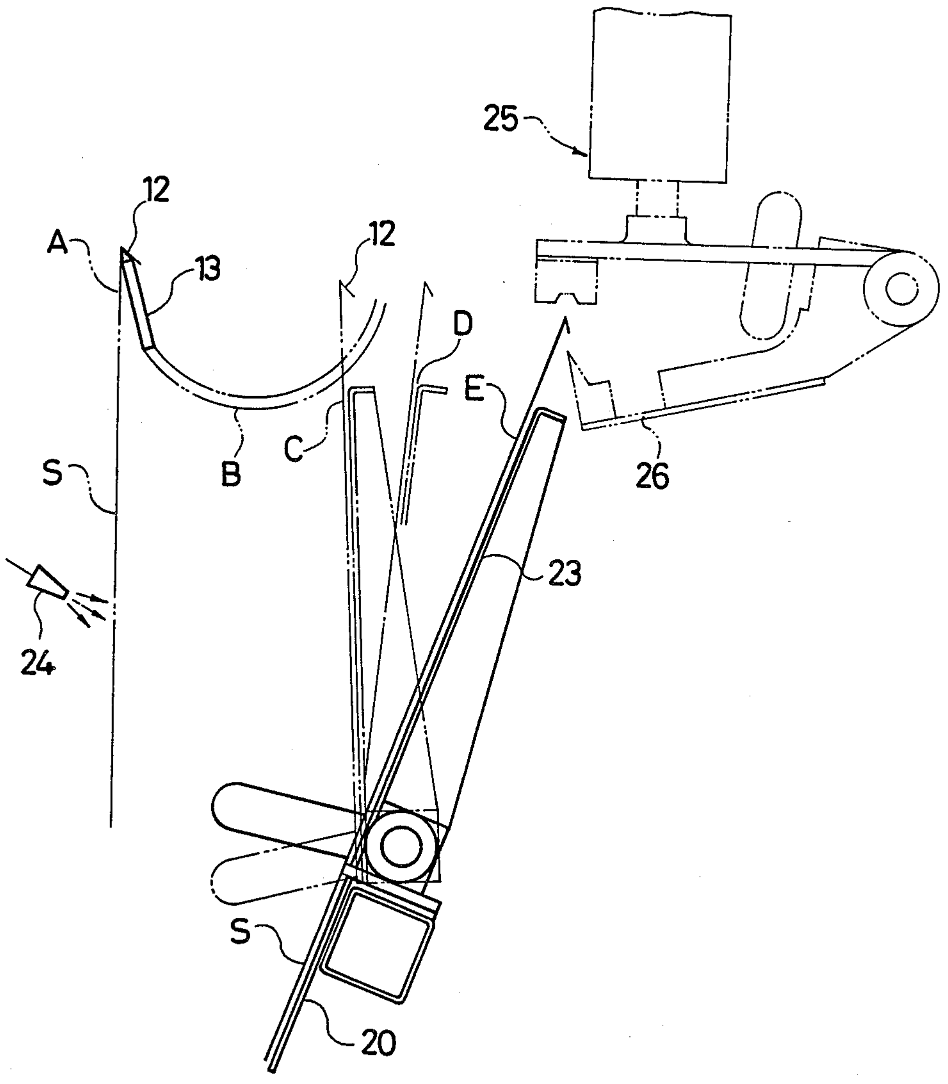
FIG. 4 illustrates the function of a pivotable positioning plate of the transfer device.

Referring initially to FIGS. 1 to 4 of the accompanying drawings, a transfer device embodying the present invention serves to transfer a lithographic plate S from a horizontal belt conveyor 1 driven by a motor 5 and shown in FIG. 1, to an overhead conveyor 25 shown in detail in FIG. 4.

The conveyor 1 delivers the lithographic plate S in an orientation such that the length of the lithographic plate extends transversely of the direction of conveyance and the transfer device comprises orienting means 2 positioned adjacent one end of the conveyor 1 to rotate the lithographic plate S through 90° to present one end of the lithographic plate to elevating means 3 for placing the lithographic plate on a positioning bed 4 from which the lithographic plate is picked up by the overhead conveyor 25.

The orienting means 2 comprises support rollers 6, a central turntable 7 which is rotatable by first driving means 10 and carries a pair of vertically movable arms 8, 8' driven by second driving means 11. The orientating means 2 presents a stop 9 extending transversely of the direction of conveyance of the plate S by the conveyor 1.

The elevating means 3 comprises a vertically disposed endless chain 30 running around lower and upper sprockets 15 and 16 supported by a frame 31 of the elevating means. The lower sprocket 15 is directly coupled to a drive motor 14 to drive the chain 30 around the sprockets 15 and 16.

The chain 30 carries a hook member 13 which extends laterally from the chain towards the orienting means. A lateral support plate 13' is also carried by the chain at a location spaced from the hook member 13 by a distance less than the length of the lithographic plate S.

The positioning bed 4 is positioned in the vicinity of the lower end of the chain 30 beneath the path followed by the hook member 13. The positioning bed 4 is in the form of a plate 20 formed at a lower edge thereof with a lip 21 forming a stop. An upper portion of the positioning bed is constituted by a pivotable flap 23 connected to the plate 20 and pivotable by means of a pneumatic or hydraulic cylinder 22.

A pair of nozzles 24 are arranged to direct respective air streams towards the positioning bed 4.

Figure 5:
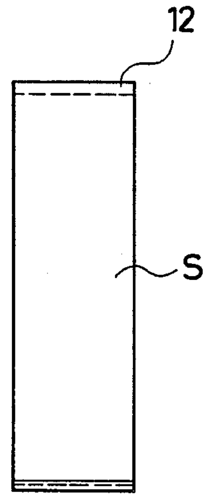
FIG. 5 is a plan view of a lithographic plate with which the transfer device shown in FIGS. 1 to 4 is intended to be used.
Figure 6:
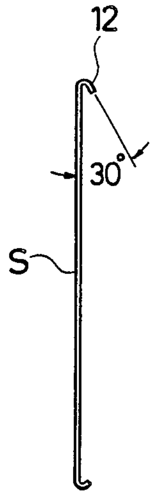
FIG. 6 is a side view of the lithographic plate shown in FIG. 5.

FIGS. 5 and 6 illustrate a lithographic plate with which the transfer device embodying the invention is intended to be used. The lithographic plate S is in the form of a thin aluminium plate having a thickness of the order of 0.3 mm and having one end 12 thereof folded over to lie at an angle of about 30° to the plane of the plate as shown in FIG. 6. In some cases, it may be desirable for both ends of the lithographic plate to be folded over in this way.

In use of the device, a lithographic plate S extending transversely of the direction of conveyance of the horizontal conveyor 1 is delivered onto the orienting means 2 in this orientation. The lithographic plate impinges upon and is arrested by the stop 9. The lifting means 11 is then actuated to raise the lithographic plate S on the arms 8 and 8' and the turntable 7 is rotated by the driving means 10 to rotate the lithographic plate through 90° to position the lithographic plate S with the folded over end portion 12 thereof located in the path of the hook member 13.

The drive motor 14 of the elevating means 3 is then activated to drive the chain 30 and thereby cause the hook member to ascend until it engages and entrains the end portion 12 of the lithographic plate. The hook member 13 continues its upward motion until it reaches a position in which the lithographic plate S assumes a vertical orientation. The support plate 13' carried by the chain 30 at a spaced location beneath the hook member 13 prevents deflection of the lithographic plate during movement of the lithographic plate with the hook member.

The motor 14 is then reversed to move the chain in the opposite direction and thus cause the hook member 13 and the lithographic plate hanging therefrom to move downwardly towards the positioning plate 4. Meanwhile, the arms 8, 8' are retracted and the turntable is rotated back by 90° to its original position to prepare for receiving the next lithographic plate S.

As the hook member 13 descends, the lithographic plate is lowered until the lower end of the plate engages the lip 21 at the lower edge of the positioning bed 4. While the lithographic plate S is still retained on the hook 13 (at point A shown in FIG. 4), air is delivered through the nozzles 24 to encourage the lithographic plate to move towards the positioning bed 4.

In order to prevent the lithographic plate being again captured by the hook member 13 as it travels around the sprocket 15 and then upwardly again with the chain 30, the cylinder 22 is actuated to pivot the upper flap 23 of the positioning bed 4 to the position indicated by C in FIG. 4, so as to position the end portion 12 of the lithographic plate S internally of the locus (indicated by the arc B in FIG. 4) of the hook member 13 as the member 13 moves with the chain 30 around the sprocket 15. Once the hook has passed, the plate 23 is pivoted back to the position D and subsequently to the position E in which the plate 20 and flap 23 lie in the same plane.

The folded upper end 12 of the lithographic plate S can then be accessed by the overhead conveyor, a clip 26 of which engages and grips the plate S, so that the plate is lifted from the positioning bed 4 and transported to a point of use by the conveyor 25.

The present invention thus provides a simple, reliable and inexpensive transfer device which provides a stable and positive transfer of the lithographic plate to the overhead conveyor.

The features disclosed in the foregoing description, in the following claims and/or in the accompanying drawings may, both separately and in any combination thereof, be material for realising the invention in diverse forms thereof.

We claim:

1. A device for transferring a lithographic plate (S) from a horizontal conveyor (1) to an overhead conveyor (25), which device comprises elevating means (3) having a hook member (13) for engaging a folded end portion (12) of a lithographic plate to raise the lithographic plate into a vertical position and then lower the lithographic plate onto a positioning bed (4) provided in the vicinity of the lower end of the elevating means, the elevating means moves in a path having a bottom portion defining a locus of points through which the hook member travels, the positioning bed having a pivotable portion (23) for pivoting the lithographic plate deposited on the positioning bed, so that the folded end of the lithographic plate is positioned internally of the locus (B) of the hook member whereby the lithographic plate is separated from the hook member and upon movement of the pivotable portion of the positioning bed, the lithographic plate is transferred to the overhead conveyor.

2. A device according to claim 1, wherein the pivotable portion of the positioning bed is pivoted by means of a pneumatic or hydraulic cylinder (22).

3. A device according to claim 1, comprising means (24) for directing a stream of air onto a lithographic plate to encourage movement towards the positioning bed.

4. A device according to claim 1, wherein the elevating means comprises a vertically disposed endless chain (30).

5. A device according to claim 1, comprising orienting means (2) for receiving a lithographic plate extending transversely of the direction of conveyance and rotating the lithographic plate through 90° in order to position the folded end portion of the plate in the path of the hook member of the elevating means.

* * * * *